(12) United States Patent  
Anderson

(10) Patent No.: US 8,840,357 B2  
(45) Date of Patent: Sep. 23, 2014

(54) MATERIAL TRANSFER SYSTEM

(75) Inventor: Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 337 days.

(21) Appl. No.: 13/186,963

(22) Filed: Jul. 20, 2011

(65) Prior Publication Data

US 2013/0022433 A1    Jan. 24, 2013

(51) Int. Cl.
| | |
|---|---|
| B60P 1/00 | (2006.01) |
| A01C 15/00 | (2006.01) |
| A01C 7/08 | (2006.01) |
| A01D 90/10 | (2006.01) |
| A01D 90/02 | (2006.01) |

(52) U.S. Cl.
CPC ............ *A01C 15/003* (2013.01); *A01C 15/006* (2013.01); *A01C 7/081* (2013.01); *A01D 90/10* (2013.01); *A01D 90/02* (2013.01)
USPC ........................................ 414/812; 414/345

(58) Field of Classification Search
USPC ........... 414/467, 526, 812, 25, 133, 218, 219, 414/220, 221, 332, 345, 340, 403, 404, 334, 414/335, 336, 343, 406, 539, 809, 810, 414/811; 701/50; 141/250; 340/988; 460/114, 115; 56/10.1, 14.7
See application file for complete search history.

(56) References Cited

U.S. PATENT DOCUMENTS

| | | | | |
|---|---|---|---|---|
| 3,232,494 | A | * | 2/1966 | Poarch ............................ 406/93 |
| 3,315,824 | A | * | 4/1967 | Kirchhoefer .................. 414/221 |
| 3,926,377 | A | * | 12/1975 | Johnson ........................ 239/655 |
| 4,614,213 | A | * | 9/1986 | Englin ............................ 141/59 |
| 4,700,895 | A | * | 10/1987 | Takata .......................... 239/664 |
| 4,988,240 | A | * | 1/1991 | Thompson .................... 406/166 |
| 5,158,129 | A | * | 10/1992 | Hubert et al. ................. 164/452 |
| 5,338,140 | A | * | 8/1994 | Ekdahl et al. ................. 414/346 |
| 5,529,455 | A | * | 6/1996 | Kaster et al. .................. 414/523 |
| 6,594,979 | B2 | * | 7/2003 | Krone et al. .................. 56/16.6 |
| 6,682,416 | B2 | * | 1/2004 | Behnke et al. ................ 460/114 |
| 7,421,334 | B2 | * | 9/2008 | Dahlgren et al. ............. 701/117 |
| 7,480,564 | B2 | * | 1/2009 | Metzler et al. ................ 701/469 |
| 7,555,990 | B2 | * | 7/2009 | Beaujot ........................ 111/123 |
| 8,126,620 | B2 | * | 2/2012 | Ringwald et al. .............. 701/50 |
| 8,180,534 | B2 | * | 5/2012 | Burke et al. .................... 701/50 |
| 2003/0175103 | A1 | * | 9/2003 | Hunt ............................ 414/526 |

\* cited by examiner

*Primary Examiner* — Saul Rodriguez  
*Assistant Examiner* — Glenn Myers  
(74) *Attorney, Agent, or Firm* — Yee & Associates, P.C.

(57) ABSTRACT

A material transfer system including a first vehicle and a second vehicle. The first vehicle has a pressurized compartment maintaining a first air pressure therein. The ambient air outside of the pressurized compartment is at a second air pressure, with the first air pressure being different than the second air pressure thereby defining a pressure differential. The second vehicle has a material discharge device. The material discharge device is capable of delivering material to the first vehicle. The second vehicle having a reservoir for receiving the material. The material passing from the reservoir into the pressurized compartment without substantial loss of the pressure differential.

2 Claims, 2 Drawing Sheets

MATERIAL TRANSFER SYSTEM

FIELD OF THE INVENTION

The present invention relates to a material transfer system, and, more particularly, to a material transfer system that maintains pressure in a pressurized compartment.

BACKGROUND OF THE INVENTION

Some agricultural devices have pressurized compartments, such as an agricultural planter. A planter is an agricultural farm implement typically towed behind a tractor that is used for planting crops in a field. The planter, air seeder or a grain drill lay the seed down in a predetermined precise manner along a series of parallel rows. The seeds that are planted are distributed through numerous row units that are generally spaced evenly along a portion of the planter. Planters vary greatly in size, from 2 rows even up through the 48-row John Deere DB120.

Historically, on smaller and older planters, a marker stick extends from the side of the planter to half the width of the planter. The marker stick has some element that drags in the soil causing a line to be drawn in the field so that the operator of the tractor knows hoe to position the tractor for the return trip across the field. On larger modern planters, a GPS navigation system as well as autopilot type steering is used to guide the planter across the field to maintain proper row spacing.

Older planters typically had a seed bin for each row, with each seed bin generally would have plates with a predetermined number of teeth with predetermined spacing depending on the type of seed to be sown and the desired spacing of the seeds in the soil. Modern planters generally have one or more large seed tanks with the seeds being distributed to each row unit. The row units perform the final task of seed metering and placement. The seed delivery process may rely on a hydraulically-driven fan to move the seed from the seed tanks to the row units. A flow control valve and gauge allows for the proper tank pressure setting based on seed type. Air from the fan pressurizes the seed tanks and delivers seed to the seed hoppers. Airflow enters the seed tanks through a nozzle in the manifold, which pressurizes the tank. The air then picks up seed and moves it out the other end of the nozzle into seed delivery hoses. These hoses route the seed toward the hopper. A small amount of seed is traveling in the delivery hoses only when needed. The hopper fills with seed until the delivery hose is covered. Once the opening is restricted, seed flow through the hose stops. Air flowing to the row unit travels into the hopper and out through a vent. As the seed is picked up by the meter and planted, the seed pool shrinks until the end of the delivery hose is uncovered. At that time, the airflow and seed delivery resume and the seed pool in the hopper is replenished.

It is important to maintain air pressure in the seed tank while planting is underway in order to maintain consistent planting. If the fill lid of the planter is opened the air pressure is lost and with it the ability to transfer the seeds therefrom.

What is needed in the art is a method and apparatus to transfer material in the form of seeds into a pressurized compartment while the machine is functioning without the loss of pressurized air in the compartment in an efficient economical manner.

SUMMARY

The invention in one form is directed to a material transfer system including a first vehicle and a second vehicle. The first vehicle has a pressurized compartment maintaining a first air pressure therein. The ambient air outside of the pressurized compartment is at a second air pressure, with the first air pressure being different than the second air pressure thereby defining a pressure differential. The second vehicle has a material discharge device. The material discharge device is capable of delivering material to the first vehicle. The second vehicle having a reservoir for receiving the material. The material passing from the reservoir into the pressurized compartment without substantial loss of the pressure differential.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplifications are not to be construed as limiting the scope of the invention in any manner.

DETAILED DESCRIPTION

Figure 1:
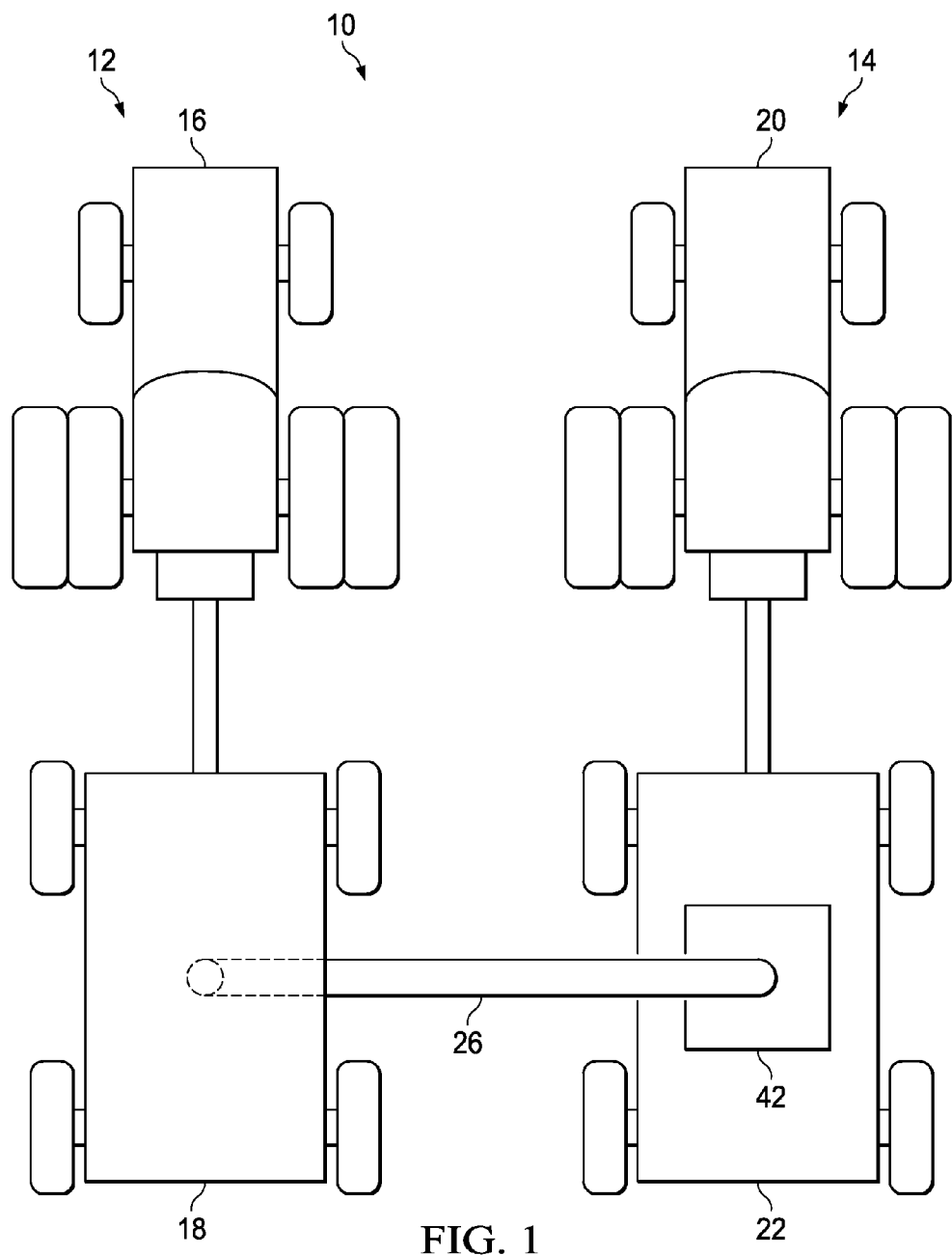
FIG. 1 is a schematical top view of a two vehicle system utilizing an embodiment of a material transfer system of the present invention.

Referring now to the drawings, and more particularly to FIG. 1, there is illustrated a material transfer system 10 that includes vehicle systems 12 and 14. Vehicle system 12 includes a tractor 16 and a towed material source 18 towed thereby. Vehicle system 14 includes a tractor 20 and a towed material receiving device 22 towed thereby. Although vehicle systems 12 and 14 are depicted as tractors and wagons, these are general depictions and are generally representative of agricultural, construction, industrial and foresting equipment, for example, towed material receiving device 22 may be an agricultural seed planter.

Figure 2:
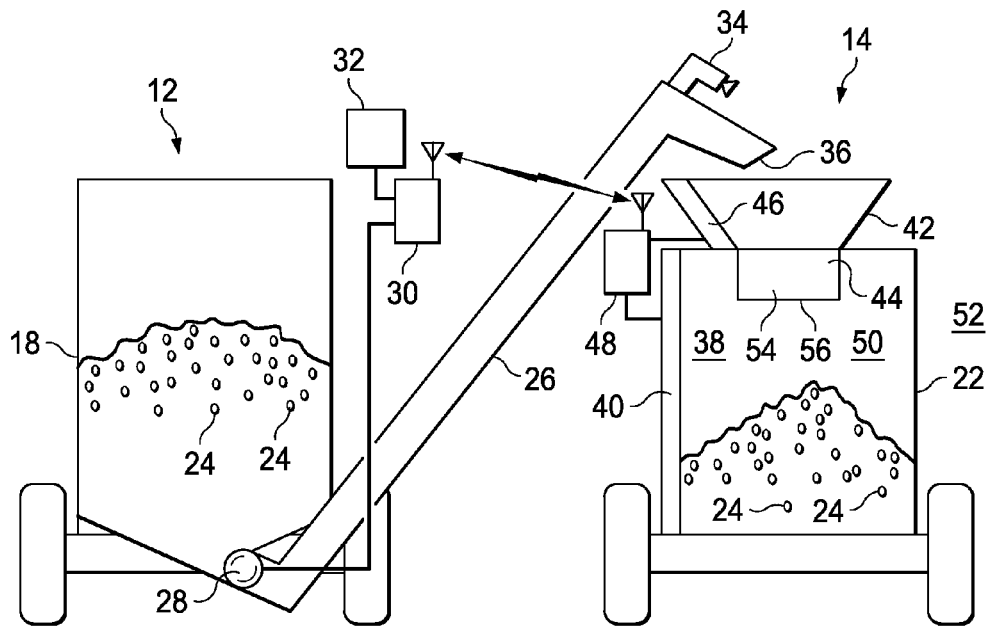
FIG. 2 is a schematical rear view of the material transfer system of FIG. 1.

Now additionally referring to FIG. 2, there is shown another view of vehicle systems 12 and 14. Granular material 24, which may be seeds are transferred from vehicle system 12 to vehicle system 14. Towed material source 18 includes a discharge device 26, a meter 28, a communicative controller 30, an operator interface 32, a spout aimer 34 and a spout outlet 36. Communicative controller 30 and operator interface 32 may be associated with either towed material source 18 or tractor 16. Towed material receiving device 22 includes a pressurized compartment 38, a material level sensor 40, a reservoir 42, an airlock 44, a reservoir level sensor 46, and a communicative controller 48.

Discharge device 26, which may include an auger, moves granular material 24 from towed material source 18 to reservoir 42. Granular material 24 moves by gravity while in a tank of towed material source 18 and the amount of granular material 24 that moves through meter 28 is measured thereby and sent to communicative controller 30. Spout aimer 34 may autonomously aim spout outlet 36 or be in communication with communicative controller 30 for the control of spout outlet 36. Additionally, information from spout aimer 34 is used by communicative controller 30 to position discharge device 26 and/or towed material source 18 relative to reservoir 42. In a preferred embodiment, spout outlet 36 and reservoir 42 are not in physical contact with one another.

Towed material receiving device 22 may have additional functions, which are not shown, such as distribution elements that distribute granular material 24. As granular material 24 accumulates in reservoir 42 reservoir level sensor 46 detects the level of granular material 24 therein and passes this information to communicative controller 48, which in turn communicates this information to communicative controller 30 to alter the flow of granular material 24 from spout outlet 36. The flow of granular material 24 is thereby controlled by this interaction between communicative controllers 30 and 48.

An air pressure 50 is maintained in pressurized compartment 38 which is different from an ambient air pressure 52 that exists outside of pressurized container 38. Airlock 44 is operated to move granular material 24 from reservoir 42 into pressurized compartment 38 without a significant loss of the pressure differential between pressures 50 and 52. Airlock 44 opens an upper opening allowing some of granular material 24 to fall from reservoir 42 into an intermediate compartment 54 of airlock 44. This upper opening then closes and a lower opening of airlock 44 opens allowing granular material 24 to fall into pressurized container 38. Airlock 44 may continue to operate in this manner in a batch mode as the upper and lower openings are repeatedly opened in closed in such a way that they are never both open at the same time. One way of doing this it to have two sets of disks with hole in them such that the upper set is open as the lower set is closed and the sets of disks are then rotated so as to alternately be open at the top and then the bottom of airlock 44. Another contemplated method is to have a small opening 56 with a mechanical device moving granulated material 24 rapidly through the small opening to thereby control the movement of air through the small opening. When the transfer of granular material 24 from reservoir 42 to pressurized compartment 38 is completed the small opening is closed. Other airlock methods are also contemplated.

Material level sensor 40 detects the level of granular material 24 in pressurized compartment 38 and passes this information to communicative controller 48. Communicative controller 48 wirelessly communicates this information to communicative controller 30 so that the end of the operation of transferring granular material 24 is detected and communicated to operator interface 32. If vehicle system 12 is autonomous, operator interface 32 may not be physically located on vehicle system 12, and may exist as a controllable interface on a display unit.

Figure 3:
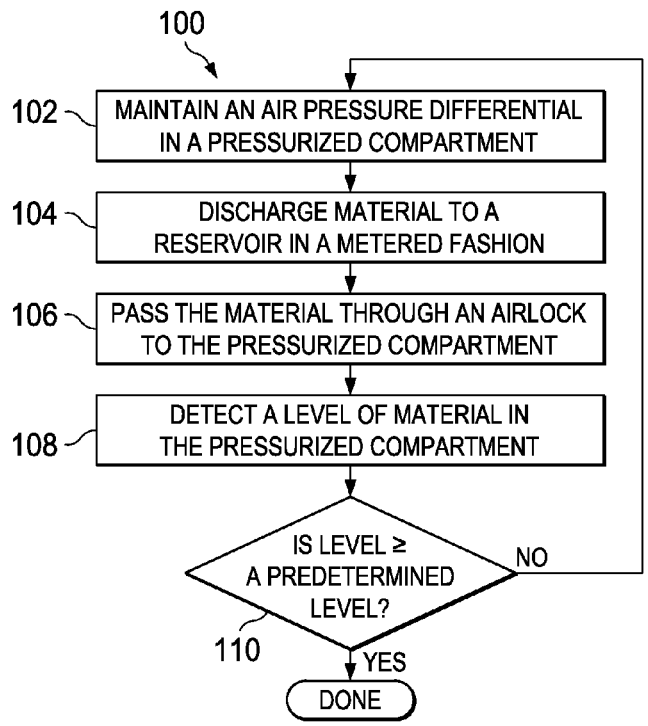
FIG. 3 is a block diagram outlining the steps carried out by a method using the material transfer system of FIGS. 1 and 2.

Now additionally referring to FIG. 3, there is shown a method 100 with steps 102-110 for the transferring of a granular material 24 from one vehicle system 12 to another vehicle system 14 while bolt vehicle systems 12 and 14 are moving and while maintaining an air pressure differential as indicated at step 102. At step 104 a metered amount of granular material 24 is moved from vehicle system 12 to reservoir 42. Once sufficient granular material 24 is in reservoir 42, then at step 106 granular material 24 is passed through airlock 44 into pressurized compartment 38 while substantially maintaining the air pressure differential between pressurized compartment 38 and the outside air. The material level is detected at step 108 by material level sensor 40. If the material level is above a predetermined amount then method 100 is done. Otherwise if granular material 24 is not up to the predetermined level method 100 continues.

The flow of granular material 24 to reservoir 42 and through airlock 44 is conjunctively controlled by communicative controllers 30 and 48 based on information received from meter 28, reservoir level sensor 46 and material level sensor 40. Additionally, communicative controllers 30 and 48 may be used to coordinate the travel of vehicle system 12 so as to coordinate the positioning of spout outlet 36 relative to reservoir 42, under the direction of an operator by way of operator interface 32. If vehicle system 12 and/or vehicle system 14 are autonomous or semi-autonomous, coordination of travel of vehicle system 12 and/or vehicle system 14 may not require human involvement.

Advantageously, the present invention allows the filling of pressurized compartment 38 while the material receiving device 22 is performing its function, which may be the distribution of seeds or fertilizer or other granular material from the compartment without the loss of air pressure in pressurized compartment 38.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of transferring material between vehicles comprising a first vehicle and a second vehicle, the method comprising the steps of:
   maintaining an air pressure differential between a pressurized compartment of the first vehicle and ambient air outside of said pressurized compartment;
   discharging material from a material discharge device of the second vehicle to a reservoir of the first vehicle for receiving the material; and
   passing the material from said reservoir into said pressurized compartment without substantial loss of said pressure differential while both the first vehicle and the second vehicle are moving.

2. The method of claim 1, further comprising the step of metering a flow of the material to the reservoir, the metering step being carried out with a first controller of the first vehicle, wherein the first controller is further configured to send information to the second vehicle, the information relating to an amount of material in the reservoir.

* * * * *